Figure 1:
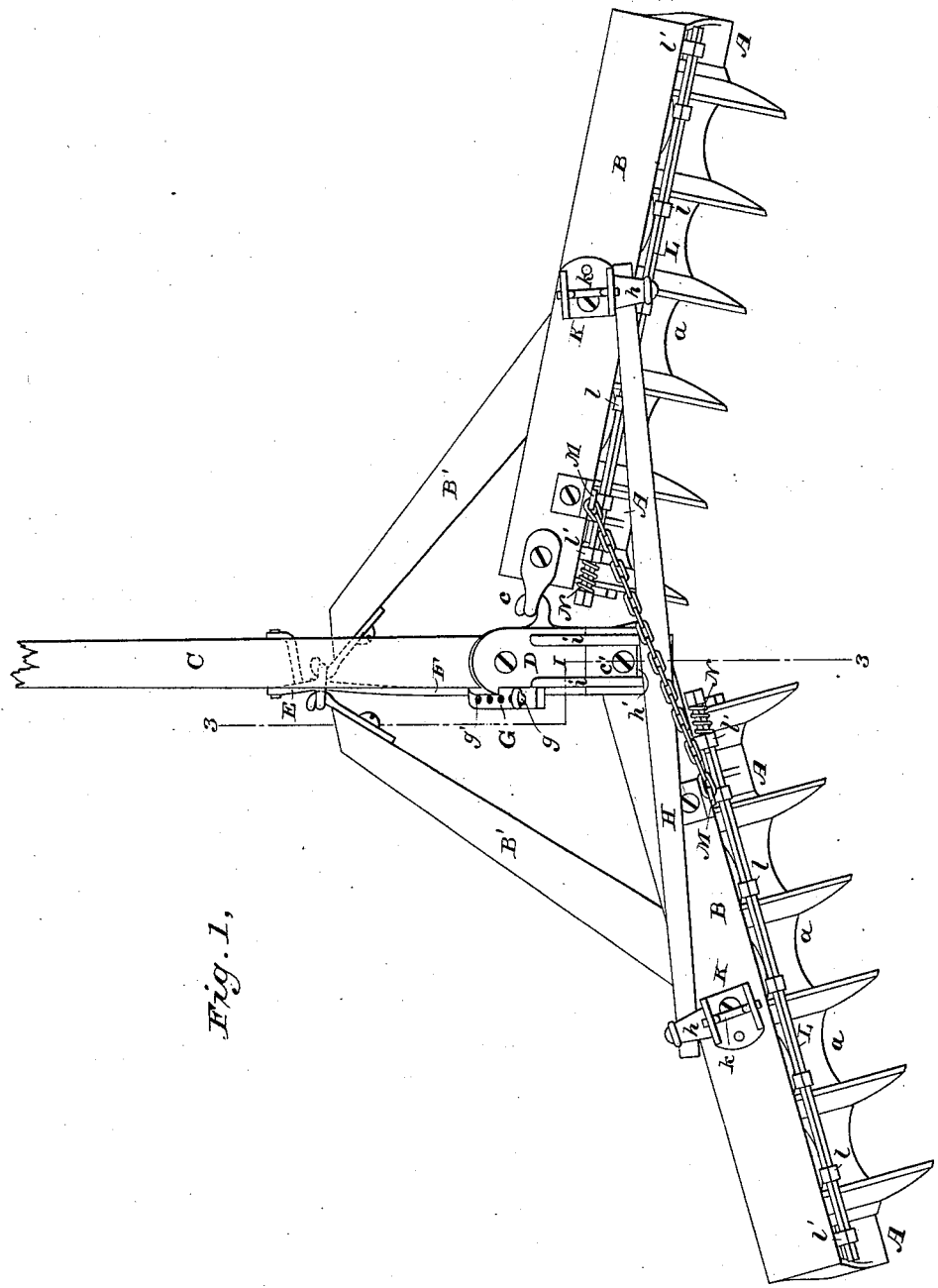

(Model.)

2 Sheets—Sheet 1.

F. BRAMER & G. G. CROWLEY.
DISK HARROW OR CULTIVATOR.

No. 247,476.

Patented Sept. 27, 1881.

WITNESSES

INVENTORS
Frank Bramer,
George G. Crowley,

By their Attorneys (Model.) 2 Sheets—Sheet 2.
F. BRAMER & G. G. CROWLEY.
DISK HARROW OR CULTIVATOR.
No. 247,476. Patented Sept. 27, 1881.
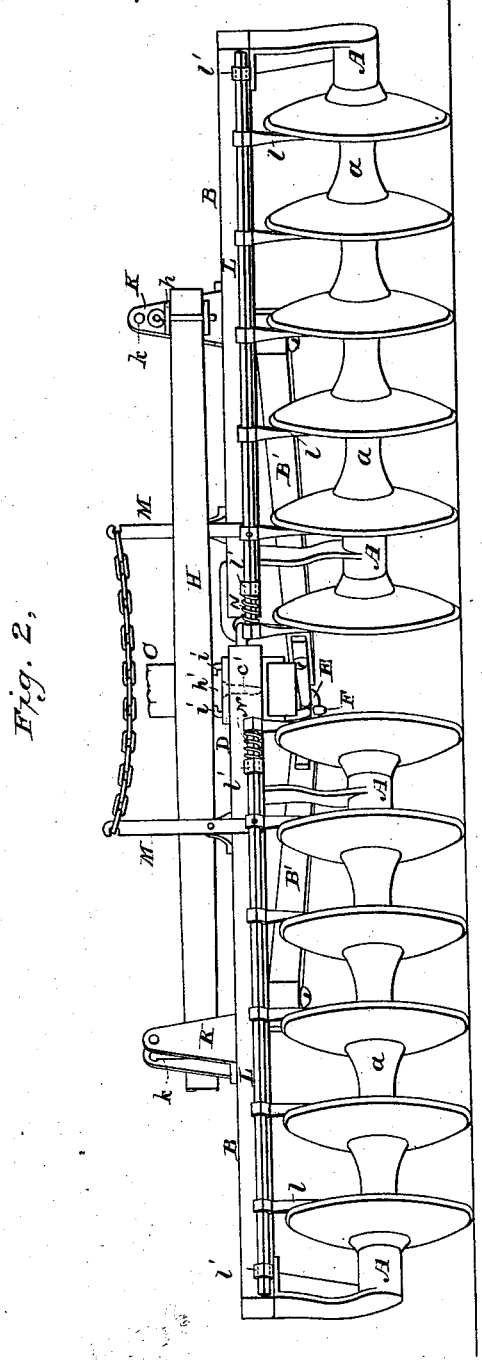
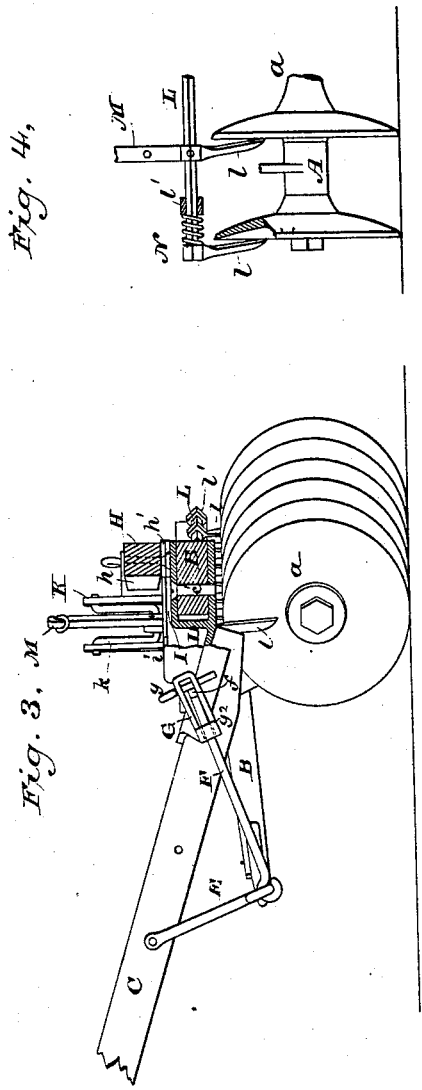
WITNESSES
Wm A. Skinkle
Geo W. Breck
By their Attorneys
Baldwin, Hopkins, & Peyton
INVENTORS
Frank Bramer,
George G. Crowley,

UNITED STATES PATENT OFFICE.

FRANK BRAMER AND GEORGE G. CROWLEY, OF LITTLE FALLS, NEW YORK; SAID CROWLEY ASSIGNOR TO SAID BRAMER.

DISK HARROW OR CULTIVATOR.

SPECIFICATION forming part of Letters Patent No. 247,476, dated September 27, 1881.

Application filed May 23, 1881. (Model.)

*To all whom it may concern:*

Be it known that we, FRANK BRAMER and GEORGE G. CROWLEY, both of Little Falls, in the county of Herkimer and State of New York, have invented certain new and useful Improvements in Disk Harrows or Cultivators, of which the following is a specification.

Our invention relates to the class of machines shown in Letters Patent No. 225,331, granted to Frank Bramer, March 9, 1880, the machine therein shown being somewhat similar in general construction to that herein described.

In the accompanying drawings, Figure 1 is a plan view; Fig. 2, a rear elevation; Fig. 3, a section on the line 3 3 of Fig. 1; and Fig. 4 is a detached view, showing two of the disks and scrapers and the end of the scraper-bar.

The disk-gang shafts $a$ have their bearings in brackets A, depending from the gang-bars B. The gang-bars are hinged or pivoted to the tongue or draft-pole C, one at $c$ and the other at $c'$ to a bracket, D, forming a rear extension of the pole. The disk-gangs are connected by draft-rods B', pivoted on the gang-bars, with a link, E, depending from the draft-pole. The backward movement of this link is controlled by a rod, F, pivoted thereto, which works in a box or guide, G, the movement of the rod and link being adjusted and limited by a pin, $g$, which fits into a series of holes, $g'$, in the box. The link is free to move forward until the bent or enlarged head $f$ of the rod comes in contact with the end $g^2$ of the box G. When the link is in the latter position (in which it may be held by the pin $g$) the disks are parallel with the line of draft. The draft is applied to the pole C, and the forward movement of the machine will cause the disk-gangs to assume an angle to the line of draft, the angle being regulated by the backward motion of the rod F, which controls the swinging link to which the draft-rods B' are attached.

When the machine is backed the link E is free to swing forward, and the disks will move into positions parallel with the line of draft. The advantages of this construction will be obvious to those skilled in the art, as we obtain a machine in which the disk-gangs promptly assume the angle to which they have been adjusted relatively to the line of draft when the machine moves forward, and when the machine is backed the disks immediately become parallel to the line of draft, and the machine can therefore be handled with great facility. The disks can be locked in this latter position when it is desired to move the machine from place to place.

By placing a pin, $g$, on each side of the head of the rod F the gangs can be locked in position against both the forward and backward movement of the machine when desired.

The gangs are rigidly braced against vertical movement by a cross-bar, H, mounted in brackets or sockets $h$ on the gang-bars B. A flanged lug or button, $h'$, is secured upon the under side of the cross-bar about midway of its length. This button slides in the guideway I on the bracket D as the gangs swing horizontally in changing their position, its flanges passing under the flanges $i$ of the guideway. By this construction the gangs are rigidly braced and united, and yet their angle to the line of draft may readily be varied.

The driver's seat is to be carried by bars mounted in the swing-stirrups $k$ in the brackets K on the gang-bars, precisely as in the patent of Bramer above referred to, and it is therefore not necessary to show or describe such construction here. The seat may, however, be carried on the draft-pole, as is common in this class of machines.

The scrapers $l$ are attached to bars L, which move longitudinally in eyes or bearings $l'$ on the gang-bars, and are thrown into the concave faces of the disks, to clear them of clogging matter, by levers M, pivoted to the gang-bars and scraper-bars. To cause the scrapers automatically to return to their normal position out of contact with the disks, coiled springs N are interposed between the enlarged ends of the scraper-bars and the inner eyes or bearings, $l'$.

The levers M are connected by a chain or rope, so that the driver on the machine or behind it can, by pressing or pulling on the chain, draw the levers toward each other and cause the scrapers to enter the concave faces of the disks, and when the strain on the chain is removed the scrapers are returned to their normal positions by the coiled springs.

In harrows and cultivators of the class similar to that herein described the tendency is, as is well known, for the disk-gangs to cut deepest at their inner ends. This tendency is objectionable for many reasons, and various ways of obviating it have been devised; thus the weight of the driver has been placed upon the outer ends of the gangs, and receptacles for weights have also been placed on the gangs to cause a uniform depth of cut. By the construction herein shown I overcome this objection and produce a harrow that works the soil to a uniform depth whether the driver be mounted thereon or not, and this by the draft of the team and without the use of weights. The disk-gangs are connected to the draft frame or pole by two joints, as usual; but it will be observed that the forward swinging or depending link-connection E of the gangs is lower than their rear joints, e e', and as the draft is applied to the pole the tendency is for the center of the machine to rise. But, further than this, the working strain or draft of the gangs is applied at their depending link-connection, which is braced and held in any desired position by the rod F, which extends upward and backward to the draft pole or frame, so that the draft of the gangs which is exerted through the rod F tends to throw up the center of the machine. The advantages of such a construction will be obvious to those familiar with this class of machines, and need not more fully be set forth.

Having thus described our invention, what we claim as new, and desire to secure by Letters Patent, is—

1. The combination, substantially as herein described, of a draft pole or frame, disk-gangs, and joints which connect the gangs to the pole or frame, the forward joint or connection of each gang with the draft-pole being lower than its rear one.

2. The combination, substantially as herein described, of a draft pole or frame, disk-gangs, a swinging connection between the gangs and the pole or frame lower than the rear joints between the gangs and frame, and a bracing-bar which extends from the swinging connection backward and upward toward the center of the machine.

3. The combination, substantially as herein described, of a draft pole or frame and disk-gangs hinged thereto, which gangs are free to swing horizontally into working position as the machine moves forward and into a position in which the disks are parallel with the line of draft when the machine is backed.

4. The combination of the draft pole or frame, disk-gangs hinged thereto, a pin or stop to limit the angle to which the gangs will be drawn by the draft of the machine in its forward movement, and a stop to hold the disks in a position parallel with the line of draft when the machine is backed, substantially as set forth.

5. The combination of the draft pole or frame, disk-gangs hinged thereto, and mechanism, substantially such as described, for adjusting the angle of the gangs relatively to the line of draft, which adjusting mechanism holds the gangs in the position which they are caused to assume by the forward motion of the machine, and holds the disks in a position parallel with the line of draft when the machine is backed, substantially as described.

6. The combination of the draft pole or frame, disk-gangs pivoted thereto, the hanging link pivoted to the pole, the draft-rods pivoted to the link and gang-bars, the adjusting-rod, the box or guide in which it works, and the adjusting-pin, substantially as and for the purpose set forth.

7. The combination of the pole or frame, the adjustable disk-gangs, the cross-brace mounted in brackets or sockets on the gang-bars, the lug or button on the cross-bar, and the way or guide in which it works, substantially as described.

8. The combination of the draft pole or frame, the disk-gangs pivoted thereto, the hanging link pivoted to the pole, the draft-rods pivoted to the link and gang-bars, the adjusting-bar, mechanism, substantially such as described, for limiting the movement of the adjusting-bar in either direction, and the cross-brace, with its flanged lug and guideway, which permits of the free horizontal movement of the gangs, but braces them rigidly vertically, substantially as described.

9. The draft pole or frame and disk-gangs pivoted thereto, which gangs freely swing horizontally into working position as the machine moves forward, and freely move into a position in which the disks are parallel with the line of draft as the machine is backed, in combination with the cross-brace which permits the free horizontal movement of the gangs, but braces them rigidly vertically, substantially as described.

10. The combination of the disk-gang, the scraper-bar, its bearings, the scrapers, the lever for moving the scraper-bar longitudinally in its bearings, and the spring for automatically returning the scrapers to their normal position out of contact with the disks, substantially as described.

11. The combination of the disk-gangs, the scraper-bars and scrapers, the levers for operating the scrapers, the springs for automatically returning the scrapers to their normal position, and a chain connecting the scraper-levers on each gang, substantially as set forth.

12. The combination of the draft pole or frame, the disk-gangs pivoted thereto, the scraper-bars and scrapers, the levers for operating the scraper-bars, and a chain connecting the levers, whereby the disks of both gangs can simultaneously be cleared of clogging matter by pressing or pulling on the chain, substantially as described.

FRANK BRAMER.
G. G. CROWLEY.

Witnesses:
WATTS T. LOOMIS,
H. WHITTEMORE.